(12) United States Patent
Yoshino (10) Patent No.: US 10,290,840 B2
(45) Date of Patent: May 14, 2019

(54) BATTERY PACKAGING MATERIAL AND BATTERY (71) Applicant: Showa Denko Packaging Co., Ltd., Isehara-shi, Kanagawa (JP)

(72) Inventor: Kenji Yoshino, Hikone (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 0 days.

(21) Appl. No.: 14/289,751

(22) Filed: May 29, 2014

(65) Prior Publication Data
US 2014/0356655 A1    Dec. 4, 2014

(30) Foreign Application Priority Data

May 31, 2013  (JP) .................. 2013-115836

(51) Int. Cl.
*H01M 2/02* (2006.01)
*H01M 2/12* (2006.01)

(52) U.S. Cl.
CPC ....... *H01M 2/0287* (2013.01); *H01M 2/0277* (2013.01); *H01M 2/0285* (2013.01); *H01M 2/1235* (2013.01); *H01M 2/1282* (2013.01)

(58) Field of Classification Search
None
See application file for complete search history.

(56) References Cited

U.S. PATENT DOCUMENTS 4,064,323 A * 12/1977 Messing ................. H01M 2/12 29/623.1
8,283,061 B2 * 10/2012 Otohata .................. H01G 2/08 156/87
2002/0142178 A1 * 10/2002 Yamashita ........... H01M 2/0275 428/461
2004/0265688 A1 * 12/2004 Arao ..................... B32B 7/10 429/176
2010/0227213 A1 * 9/2010 Hata ...................... B32B 7/12 429/163

(Continued)

FOREIGN PATENT DOCUMENTS

JP    2005116235 A  *  4/2005  ............ H01M 2/12
JP    2010092703 A  *  4/2010  ............ H01M 2/02

(Continued)

OTHER PUBLICATIONS

English Translation JP 2005116235A.*
Machine Translation JP2010092703(A) (Year: 2010).*

*Primary Examiner* — Stewart A Fraser
*Assistant Examiner* — Victoria H Lynch
(74) *Attorney, Agent, or Firm* — Keating and Bennett, LLP (57) ABSTRACT

A battery packaging material includes a stretched heat-resistant resin film layer as an outer layer which is laminated and integrated on one surface of an aluminum foil layer through a first adhesive layer; and a non-stretched thermoplastic resin film layer which is laminated and integrated as an inner layer on the other surface of the aluminum foil layer through a second adhesive layer, in which the second adhesive layer is an adhesive layer which is formed by a dry lamination method and whose melting point is 60° C. to 100° C., the adhesion strength of the inner layer and the aluminum foil layer is 3.0 N/15 mm width or more at 80° C., and the adhesion strength is 2.0 N/15 mm width or less at 120° C.

10 Claims, 6 Drawing Sheets (56) References Cited

U.S. PATENT DOCUMENTS

| | | | |
|---|---|---|---|
| 2012/0176730 A1 | 7/2012 | Takemura et al. | |
| 2014/0072864 A1* | 3/2014 | Suzuta | B32B 15/08 |
| | | | 429/176 |
| 2014/0087241 A1* | 3/2014 | Kuramoto | B32B 7/12 |
| | | | 429/176 |
| 2015/0380692 A1* | 12/2015 | Ojiri | B32B 15/20 |
| | | | 429/176 |

FOREIGN PATENT DOCUMENTS

| | | | | |
|---|---|---|---|---|
| JP | 2012-012088 A | 1/2012 | | |
| JP | 2012-156404 A | 8/2012 | | |
| JP | 2012-156489 A | 8/2012 | | |
| JP | 2012-203982 A | 10/2012 | | |
| WO | 2012/133663 A1 | 10/2012 | | |
| WO | 2013168731 | * 11/2013 | | H01M 2/02 |

* cited by examiner

FIG. 8

BATTERY PACKAGING MATERIAL AND BATTERY

TECHNICAL FIELD

The present invention relates to a battery packaging material for a lithium ion secondary battery and the like.

In this specification and Claims, the term of "aluminum" includes aluminum and an alloy thereof.

TECHNICAL BACKGROUND

The lithium ion secondary battery has been widely used as, for example, the power source of a notebook PC, a video camera, a cellular phone, and an electric vehicle. As this lithium ion secondary battery, one having a configuration in which the circumference of the battery body portion (body portion containing an anode, a cathode, and an electrolyte) is surrounded with a case has been used. As the case material (packaging material), one having a configuration in which an outer layer containing a heat-resistant resin film, an aluminum foil layer, and an inner layer containing a thermoplastic resin film are bonded and integrated in this order is known, for example.

In the lithium ion secondary battery and the like, gas is likely to be generated in the battery body portion when the battery is overcharged or the temperature excessively rises, and therefore the gas is gradually accumulated in the internal space covered with the packaging material, so that the internal pressure in the packaging material rises in some cases. When the internal pressure rise becomes high, there is a concern that the packaging material is burst, so that the contents inside the battery are scattered. Therefore, techniques of preventing such burst of the packaging material have been proposed.

For example, Patent Document 1 describes an electricity accumulation device with an burst-proof function having an electrode laminate in which an anode and a cathode molded into a sheet shape are laminated through a separator, in which the electrode laminate is accommodated in a container formed with a metal laminate film with an electrolytic solution and the container is hermetically sealed with a heat sealing portion obtained by thermally bonding the metal laminate film in a belt shape along the outer periphery of the container, and the device having a perforating device having an edge support attached and fixed in a state where the portion of the outer periphery of the container is sandwiched and an edge member supported by the edge support and disposed on the side of the center portion relative to the heat sealing portion in the container, in which the edge support moves in the outer peripheral direction of the container by being pushed out by the container which is expanded and deformed when gas is generated and the edge member moves with the edge support to thereby tear the container.

Moreover, Patent Document 2 describes an electricity accumulation element having an electricity accumulation element body impregnated with an electrolytic solution, a packaging body which seals the electricity accumulation element body, a first gas discharge mechanism portion provided inside the packaging body, and a second gas discharge mechanism portion provided on the outside of the packaging body, in which gas from an internal space of the packaging body where the electricity accumulation element body is present successively passes through each of the gas discharge mechanism portions, and thus the discharge of the gas from the internal space to the outer space is permitted, and the element having a pressure adjustment device which prevents the entry of the gas from the outer space into the internal space by each of the gas discharge mechanism portions, in which each of the gas discharge mechanism portions is provided with a buffer space individually divided by each of the gas discharge mechanism portions.

Patent Document 1: Japanese Unexamined Patent Application Publication No. 2012-156404
Patent Document 2: Japanese Unexamined Patent Application Publication No. 2012-156489

Problems to be Solved by the Invention

However, when the perforating device having the edge support and the edge member is provided as in Patent Document 1, there has been problems in that a new process for providing the perforating device has been required, which has complicated the manufacturing process and also has reduced the productivity. Moreover, since it is required to provide a new constituent portion of the perforating device, and thus the cost also increases.

Moreover, when the safety valve mechanism (gas discharge mechanism portion and the like) for discharging the gas generated inside the packaging body to the outside of the packaging body is provided as in Patent Document 2, there has been problems in that a new process for providing the safety valve mechanism has been required, which has complicated the manufacturing process and also has reduced the productivity. Moreover, it is required to provide a new constituent portion of the safety valve mechanism, and thus the cost also increases.

The present invention has been made in view of the above-described technical background. It is an object of the present invention to provide a battery packaging material and a battery which have good productivity, can suppress cost, and can secure sufficient seal properties, and in which when the temperature of a battery case constituted by a packaging material excessively rises, degassing is performed, so that the burst of the packaging material due to the internal pressure rise can be prevented.

Means to Solve the Problems

In order to achieve the objects described above, the present invention provides the following measures.

[1] A battery packaging material, having: a stretched heat-resistant resin film layer as an outer layer which is laminated and integrated on one surface of an aluminum foil layer through a first adhesive layer; and a non-stretched thermoplastic resin film layer as an inner layer which is laminated and integrated on the other surface of the aluminum foil layer through a second adhesive layer, in which the second adhesive layer is an adhesive layer which is formed by a dry lamination method and whose melting point is 60° C. to 100° C., the adhesion strength of the inner layer and the aluminum foil layer is 3.0 N/15 mm width or more at 80° C. and the adhesion strength of the inner layer and the aluminum foil layer is 2.0 N/15 mm width or less at 120° C.

[2] The battery packaging material according to the item 1 above, in which the melting point of an adhesive constituting the second adhesive layer is 70° C. to 90° C.

[3] A battery, having: two battery packaging materials according to the item 1 or 2; and a battery body portion, in which the battery body portion is disposed between the two battery packaging materials, the peripheral portions of the inner layers of the two battery packaging materials are seal bonded by heat sealing to thereby form a battery case, and the battery body portion is enclosed inside the battery case.

[4] The battery according to the item 3 above, in which when the temperature of the battery case rises to the range of 120° C. to 160° C., a penetration exhaust path which communicates with the internal space of the battery case is generated in the inner layer and also a separation gap which communicates with the penetration exhaust path is generated between the aluminum foil layer and the inner layer, and then the gas in the battery case is discharged to the outside through the penetration exhaust path and the separation gap, so that the burst of the battery case due to the internal pressure rise can be prevented.

[5] The battery according to the item 3 or 4 above, in which at least one of the two battery packaging materials is molded into a three dimensional shape by deep draw forming or bulging.

[6] The battery according to the item 5 above, in which the penetration exhaust path is generated in a corner portion formed into a curved shape or a bent shape by the deep draw forming or the bulging in the inner layer or around the corner portion.

Effect of the Invention

The invention (battery packaging material) of [1] has the configuration in which the second adhesive layer is an adhesive layer which is formed by a dry lamination method and whose melting point is 60° C. to 100° C. and the adhesion strength of the inner layer and the aluminum foil layer is 3.0 N/15 mm width or more at 80° C. and the adhesion strength of the inner layer and the aluminum foil layer is 2.0 N/15 mm width or less at 120° C. Therefore, when gas is generated and accumulated in the battery body portion when the battery temperature excessively rises, so that the internal pressure rises and also when the temperature of the battery case constituted by the packaging material excessively rises, the separation gap is most likely to be generated between the inner layer and the aluminum foil layer. Therefore, when gas is generated and accumulated in the battery body portion when the battery temperature excessively rises, so that the internal pressure rises and also when the temperature of the battery case constituted by the packaging material excessively rises, the separation gap is generated between the inner layer and the aluminum foil layer, which can contribute to the discharge of the gas inside the battery case to the outside, so that the burst of the packaging material due to the internal pressure rise of the battery case constituted by the packaging material can be prevented.

Moreover, the separation gap is generated in the second adhesive layer between the inner layer and the aluminum foil layer. Therefore, after the gas is discharged to the outside through the separation gap, the separated adhesives in the second adhesive layers can be promptly melted and attached (bonded) by heat to block the separation gap, and therefore the content liquid of the battery can be sufficiently prevented from flowing to the outside.

Furthermore, it is not required to separately provide a new constituent portion (the perforating device and the gas discharge mechanism portion as in the former techniques) in order to discharge the gas to the outside. Therefore, there are advantages in that the cost can be suppressed and a size reduction can be further achieved.

According to the invention of [2], the melting point of the adhesive constituting the second adhesive layer is 70° C. to 90° C. Therefore, the burst of the packaging material due to the internal pressure rise of the battery case constituted by the packaging material can be more sufficiently prevented and also after the gas is discharged to the outside through the separation gap, the separated adhesives in the second adhesive layers can be more promptly and more sufficiently re-bonded by heat to sufficiently block the separation gap, and therefore the content liquid in the battery can be more sufficiently prevented from flowing to the outside.

According to the invention (battery) of [3] and [4], the battery case is formed due to the fact that the peripheral portions of the inner layers of the two battery packaging materials in which the battery body portion is disposed therebetween are seal bonded by heat sealing, the battery body portion is enclosed inside the battery case, and when gas is generated and accumulated in the battery body portion when the battery temperature excessively rises, so that the internal pressure rises and also when the temperature of the battery case rises to the range of 120° C. to 160° C., the penetration exhaust path which communicates with the internal space of the battery case is generated in the inner layer and also the separation gap which communicates with the penetration exhaust path is generated between the aluminum foil layer and the inner layer, and then the gas in the battery case can be discharged to the outside through the penetration exhaust path and the separation gap. Therefore, the burst of the battery case due to the internal pressure rise can be prevented.

Moreover, the separation gap is generated in the second adhesive layer between the inner layer and the aluminum foil layer. Therefore, after the gas is discharged to the outside through the separation gap, the separated adhesives in the second adhesive layers can be more promptly melted and attached (bonded) by heat to block the separation gap, and therefore the content liquid in the battery can be sufficiently prevented from flowing to the outside.

Furthermore, it is not required to separately provide a new constituent portion (the perforating device and the gas discharge mechanism portion as in the former techniques) in order to discharge gas to the outside, there are advantages in that the cost can be suppressed and a size reduction can be further achieved.

According to the invention (battery) of [5], at least one of the two battery packaging materials is molded into a three dimensional shape by deep draw forming or bulging and when gas is generated and accumulated in the battery body portion when the battery temperature excessively rises, so that the internal pressure rises and also when the temperature of the battery case rises to the range of 120° C. to 160° C., the penetration exhaust path is more likely to be generated in a portion formed into a curved shape or a bent shape by the deep draw forming or the bulging or around the portion, so that the burst of the battery case due to the internal pressure rise of the battery case can be sufficiently prevented.

According to the invention (battery) of [6], the penetration exhaust path is generated in a corner portion formed into a curved shape or a bent shape by the deep draw forming or the bulging in the inner layer or around the corner portion. Therefore, when gas is generated and accumulated in the battery body portion when the battery temperature excessively rises, so that the internal pressure rises and also when the temperature of the battery case rises to the range of 120° C. to 160° C., the penetration exhaust path is more likely to be generated and the burst of the battery case due to the internal pressure rise of the battery case can be more sufficiently prevented.

PREFERRED EMBODIMENTS FOR CARRYING OUT THE INVENTION

Figure 1:
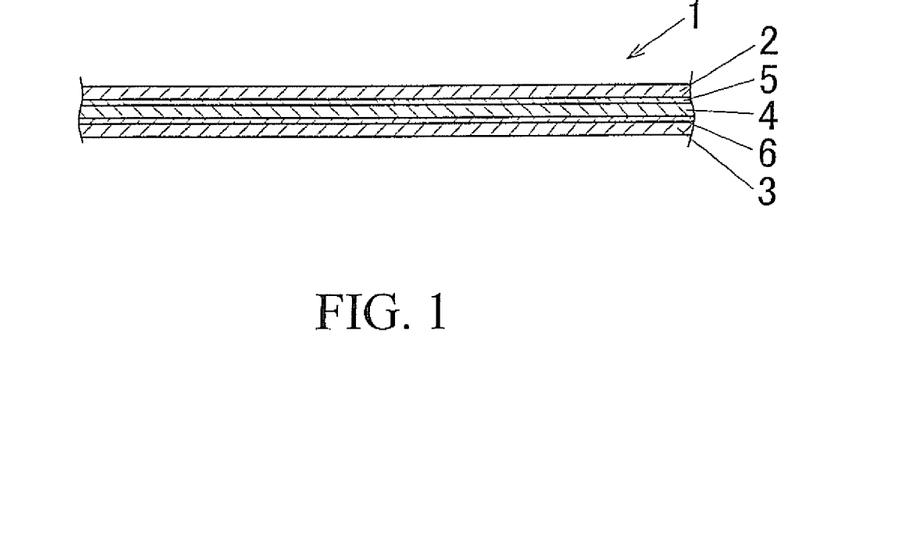
FIG. 1 is a cross sectional view illustrating one embodiment of a battery packaging material of the present invention.

One embodiment of a battery packaging material 1 according to the present invention is illustrated in FIG. 1. The battery packaging material 1 is used as a lithium ion secondary battery packaging material. The battery packaging material 1 has a configuration in which a stretched heat-resistant resin film layer (outer layer) 2 is laminated and integrated on the upper surface of an aluminum foil layer 4 through a first adhesive layer 5 and a non-stretched thermoplastic resin film layer (inner layer) 3 is laminated and integrated on the lower surface of the aluminum foil layer 4 through a second adhesive layer 6.

In the present invention, a configuration is adopted in which the second adhesive layer 6 is an adhesive layer which is formed by a dry lamination method and whose melting point is 60° C. to 100° C., the adhesion strength of the inner layer 3 and the aluminum foil layer 4 is 3.0 N/15 mm width or more at 80° C., and the adhesion strength of the inner layer 3 and the aluminum foil layer 4 is 2.0 N/15 mm width or less at 120° C. Since such a specific configuration is adopted, when gas is generated and accumulated in a battery body portion when the temperature of a battery 10 excessively rises, so that the internal pressure rises and also when the temperature of a battery case 11 constituted by the packaging material 1 excessively rises, a penetration exhaust path 21 which communicates with an internal space 12 of the battery case is generated in the inner layer 3 and also a separation gap 22 is most likely to be generated between the inner layer 3 and the aluminum foil layer 4. Therefore, when gas is generated and accumulated in a battery body portion 15 when the temperature of the battery 10 excessively rises, so that the internal pressure rises and also when the temperature of the battery case 11 constituted by the packaging material 1 excessively rises (for example, in the range of 120° C. to 160° C.), the penetration exhaust path 21 which communicates with the internal space 12 of the battery case is generated in the inner layer 3 and also the separation gap 22 is generated between the inner layer 3 and the aluminum foil layer 4, which can contribute to the discharge of the gas inside the battery case 11 (packaging material 1) to the outside, so that the burst of the packaging material 1 due to the internal pressure rise of the battery case 11 constituted by the packaging material can be prevented.

Immediately after the gas is discharged to the outside, the second adhesives 6 fill and block the separation gap 22 (the separated second adhesives are melted and attached by heat to block the separation gap 22). Therefore, the outflow of an electrolytic solution can be prevented. Thus, it can be said that the battery packaging material 1 of the present invention has a safety valve mechanism.

In the present invention, the second adhesive layer 6 is formed by a dry lamination method. When the second adhesive layer 6 is formed by a heat lamination method, the adhesive layer formed by a heat lamination method has strong heat resistance and the adhesion strength hardly decreases even when the temperature excessively rises, which poses a problem in that when the temperature of the battery case constituted by the packaging material excessively rises, gas is not discharged to the outside (refer to Comparative Example 1 described later). On the other hand, the adhesive layer formed by a dry lamination method has a strong tendency that a reduction in the adhesion strength becomes remarkable when the temperature excessively rises. Particularly when the temperature rises to a temperature region of 100° C. to 110° C., the tendency that the adhesion strength sharply decreases is high (therefore, when the temperature excessively rises, the separation gap is generated in the second adhesive layer 6) and on the other hand, a reduction in the adhesion strength is relatively low when the temperature is from room temperature to 90° C., so that sufficient adhesion strength can be secured in a normal state of the battery (separation between the layers does not occur). Therefore, the present invention is configured so that the second adhesive layer 6 is an adhesive layer formed by a "dry lamination method".

When the melting point of the second adhesive layer 6 is less than 60° C., the adhesion strength of the inner layer 3 and the aluminum foil layer 4 is less than 3.0 N/15 mm width at 80° C. Therefore, there arise a problem in that the second adhesive layer 6 is separated in a temperature region of 80° C. to 120° C. between the inner layer 3 and the aluminum foil layer 4 in the battery case, so that the shape of the battery case cannot be held.

When the melting point of the second adhesive layer 6 exceeds 100° C., the adhesion strength cannot be sufficiently obtained at normal temperature, and therefore there is a problem in that a possibility of causing separation between the layers is high.

In particular, the melting point of the second adhesive layer 6 is preferably 70° C. to 90° C.

When the second adhesive layer 6 does not have the melting point (when the melting point of the second adhesive layer 6 is not present), the adhesion strength of the inner layer 3 and the aluminum foil layer 4 exceeds 2.0 N/15 mm at 120° C. Therefore, when gas is generated and accumulated in the battery body portion when the battery temperature excessively rises, so that the internal pressure rises and also when the temperature of the battery case constituted by the packaging material excessively rises, gas is not discharged to the outside, and therefore there is a possibility that the burst of the packaging material 1 due to the internal pressure rise cannot be prevented. As the adhesive not having a melting point, an adhesive used in Comparative Example 2 is mentioned, for example.

Moreover, when the adhesion strength of the inner layer 3 and the aluminum foil layer 4 is less than 3.0 N/15 mm width at 80° C., the adhesion strength of the inner layer 3 and the aluminum foil layer 4 is insufficient, and there is a possibility that separation between the layers occurs with time.

In the case where the adhesion strength of the inner layer 3 and the aluminum foil layer 4 exceeds 2.0 N/15 mm width at 120° C., when gas is generated and accumulated in the battery body portion when the battery temperature excessively rises, so that the internal pressure rises and also when the temperature of the battery case constituted by the packaging material excessively rises, gas is not discharged to the outside.

In the present invention, the adhesion strength of the inner layer 3 and the aluminum foil layer 4 is preferably in the range of 4.0 N/15 mm width to 12 N/15 mm width at 80° C. The adhesion strength of the inner layer 3 and the aluminum foil layer 4 is preferably 0.1 N/15 mm width to 2.0 N/15 mm width at 120° C.

The adhesion strength of the inner layer 3 and the aluminum foil layer 4 is preferably in the range of 5 N/15 mm width to 30 N/15 mm width at 25° C. and particularly preferably in the range of 10 N/15 mm width to 25 N/15 mm width at 25° C.

As the non-stretched thermoplastic resin film constituting the inner layer 3, it is preferable to use a non-stretched thermoplastic resin film whose seal strength when two films are laminated, and then heat sealed is in the range of 30 N/15 mm to 110N/15 mm width. Due to the fact that the seal strength is 30 N/15 mm or more, a sufficient heat-seal strength can be secured and leakage of the contents can be sufficiently prevented.

The stretched heat-resistant resin film layer (outer layer) 2 is a member which mainly has a role of securing good moldability as the packaging material, i.e., has a role of preventing the fracture due to necking of the aluminum foil during molding.

The stretched heat-resistant resin film layer (outer layer) 2 is not particularly limited and a stretched polyamide film (stretched nylon film and the like) and stretched polyester film are preferably used, for example. The stretched heat-resistant resin film layer 2 is particularly preferably constituted by a biaxially stretched polyamide film (biaxially stretched nylon film and the like), a biaxially stretched polybutylene terephthalate (PBT) film, a biaxially stretched polyethylene terephthalate (PET) film, or a biaxially stretched polyethylenenaphthalate (PEN) film. The nylon is not particularly limited and includes 6 nylon, 6,6 nylon, MXD nylon, and the like, for example. The stretched heat-resistant resin film layer 2 may be formed by a single layer (single stretched film) or may be formed by a double layer containing a stretched polyester film and a stretched polyamide film (double layer containing a biaxially stretched PET film and a biaxially stretched nylon film and the like), for example.

In particular, the stretched heat-resistant resin film layer 2 preferably has a double layer configuration containing a biaxially stretched polyester film disposed on the outward side and a biaxially stretched polyamide film disposed on the side of the first adhesive layer. Furthermore, the stretched heat-resistant resin film layer 2 more preferably has a double layer configuration containing a biaxially stretched polyethylene terephthalate film disposed on the outward side and a biaxially stretched nylon film disposed on the side of the first adhesive layer.

The thickness of the stretched heat-resistant resin film layer 2 is preferably set to 12 µm to 50 µm.

The non-stretched thermoplastic resin film layer (inner layer) 3 has roles of imparting excellent chemical resistance also to an electrolytic solution with strong corrosivity and the like to be used in a lithium-ion secondary battery and the like and also imparting heat-seal properties to the packaging material.

The non-stretched thermoplastic resin film layer 3 is not particularly limited and is preferably constituted by a non-stretched film containing at least one kind of a thermoplastic resin selected from the group consisting of polyethylene, polypropylene, an olefin copolymer, and acid modified substances and ionomers thereof.

The thickness of the non-stretched thermoplastic resin film layer 3 is preferably set to 20 µm to 80 µm. By setting the thickness to 20 µm or more, the generation of a pinhole can be sufficiently prevented and also, by setting the thickness to 80 µm or less, the resin consumption amount can be reduced and the cost reduction can be achieved. In particular, the thickness of the non-stretched thermoplastic resin film layer 3 is preferably set to 30 µm to 50 µm.

Both the stretched heat-resistant resin film layer 2 and the non-stretched thermoplastic resin film layer 3 may be a single layer or a double layer.

The aluminum foil layer 4 has a role of imparting gas barrier properties of preventing the entry of oxygen or moisture into the packaging material. As the aluminum foil 4, a foil having a thickness of 5 to 50 µm containing pure Al or an Al—Fe alloy is preferably used.

The outer layer and the inner layer of the battery packaging material are layers containing resin. There is a possibility that light, oxygen, and liquid may enter the resin layers from the outside of the case although the amount is very slight amount and there is a possibility that the contents (the electrolytic solution of the battery, foods, pharmaceuticals, and the like) may enter the resin layers from the inside. When the entering substances reach the metal foil layer, the entering substances cause corrosion of the metal foil layer. In the present invention, it is preferable to adopt a configuration in which a chemical conversion coating having high corrosion resistance is formed on both surfaces of the aluminum foil. In this case, the corrosion resistance of the aluminum foil layer 4 can be improved.

The chemical conversion coating is a coating which is formed by subjecting the surface of the metal foil to chemical conversion treatment, and can be formed by subjecting the metal foil to chromating treatment or non-chromium type chemical conversion treatment using a zirconium compound, for example. For example, in the case of the chromating treatment, any one of the following aqueous solutions 1) to 3) is applied to the surface of the metal foil subjected to degreasing treatment, and then dried:

1) Aqueous solution containing a mixture of metal salts of phosphoric acid, chromic acid, and fluoride, 2) Aqueous solution containing a mixture of phosphoric acid, chromic acid, metal salt and non-metal salt of fluoride, and 3) Aqueous solution containing a mixture of acrylic resin or/and phenol resin, phosphoric acid, chromic acid, and metal salt of fluoride.

For the chemical conversion coating, the chromium adhesion amount (per one surface) is preferably 0.1 mg/m$^2$ to 50 mg/m$^2$ and particularly preferably 2 mg/m$^2$ to 20 mg/m$^2$.

The chemical conversion coating with such a chromium adhesion amount allows the formation of a molding packaging material with high corrosion resistance.

A configuration in which the chemical conversion coating is formed only on one surface of the aluminum foil may be adopted.

The first adhesive layer 5 is not particularly limited, and is preferably an adhesive layer which can set the adhesion strength of the outer layer 2 and the aluminum foil layer 4 in the range of 3 N/15 mm width to 14 N/15 mm width at 25° C. and includes a urethane adhesive layer, an acryl adhesive layer, and the like, for example.

For example, in the case of using a stretched polyamide film as the stretched heat-resistant resin film layer 2, when a urethane adhesive layer is adopted as the first adhesive layer 5, the adhesion strength of the outer layer 2 and the aluminum foil layer 4 can be set in the range of 3 N/15 mm width to 14 N/15 mm width at 25° C.

The second adhesive layer 6 is an adhesive layer which is formed by a dry lamination method and whose melting point is 60° C. to 100° C. and is not particularly limited insofar as the adhesive layer has an adhesion strength of the inner layer 3 and the aluminum foil layer 4 of 3.0 N/15 mm width or more at 80° C. and 2.0 N/15 mm width or less at 120° C. The second adhesive layer 6 includes, for example, an adhesive layer formed with maleic anhydride modified polyethylene, maleic anhydride modified polypropylene, and the like.

For example, in the case where a non-stretched film layer containing at least one kind of a thermoplastic resin selected from the group consisting of polyethylene, polypropylene, an olefin copolymer, and acid modified substances and ionomers thereof is used as the non-stretched thermoplastic resin film layer 3, when an adhesive layer containing acid modified polyolefin, such as maleic anhydride modified polyethylene and maleic anhydride modified polypropylene, is used as the second adhesive layer 6, an adhesive layer can be obtained in which the adhesion strength of the inner layer 3 and the aluminum foil layer 4 is 3.0 N/15 mm width or more at 80° C. and 2.0 N/15 mm width or less at 120° C.

Although it is required that the melting point of the second adhesive layer 6 is 60° C. to 100° C., the melting point of the second adhesive layer 6 can be adjusted with the molecular weight of the adhesive, the selection of a functional group, and the like.

Figure 4:
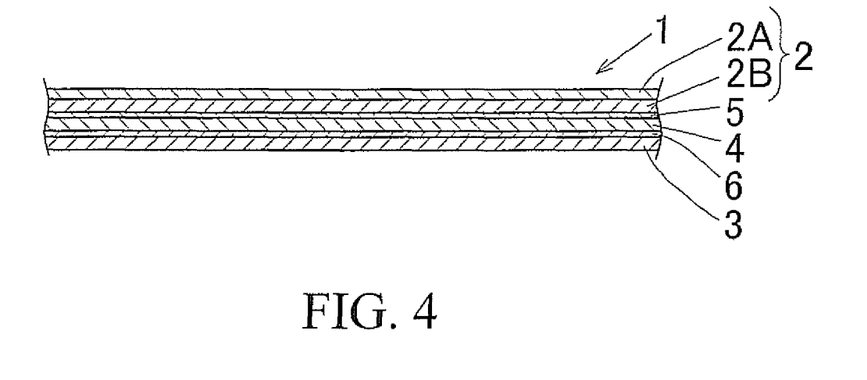
FIG. 4 is a cross sectional view illustrating another embodiment of the battery packaging material of the present invention.
Figure 5:
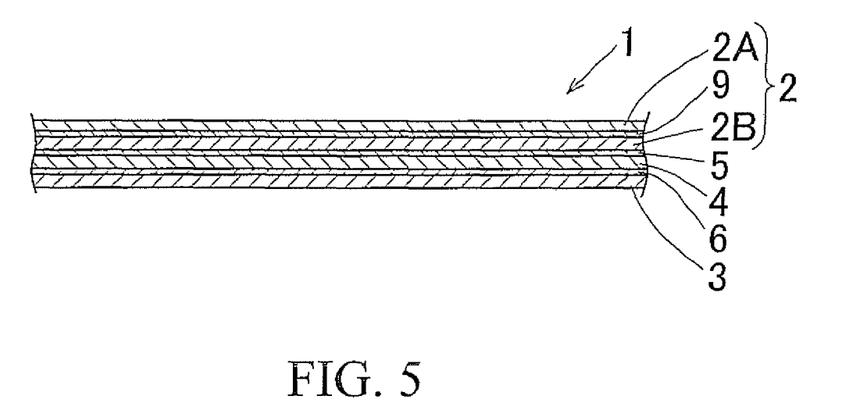
FIG. 5 is a cross sectional view illustrating a still another embodiment of the battery packaging material of the present invention.

In the battery packaging material 1 of the present invention, the battery packaging material 1 of a laminated configuration illustrated in FIG. 4 and FIG. 5 can be mentioned as the configuration in which the stretched heat-resistant resin film layer 2 is formed with a double layer. In the battery packaging material 1 illustrated in FIG. 4, the stretched heat-resistant resin film layer 2 contains a two-layer laminated configuration. Specific examples include, for example, a configuration in which a stretched PET (polyethylene terephthalate) film was used as a stretched heat-resistant resin film 2A on the outermost side and a stretched nylon film is used as a stretched heat-resistant resin film 2B inside the film.

In the battery packaging material 1 illustrated in FIG. 5, the stretched heat-resistant resin film layer 2 contains a three-layer laminated configuration. Specific examples include, for example, a configuration in which a stretched PET (polyethylene terephthalate) film is used as the stretched heat-resistant resin film 2A on the outermost side and a stretched nylon film is used as the stretched heat-resistant resin film 2B through the adhesive layer 9 inside the film.

Figure 2:
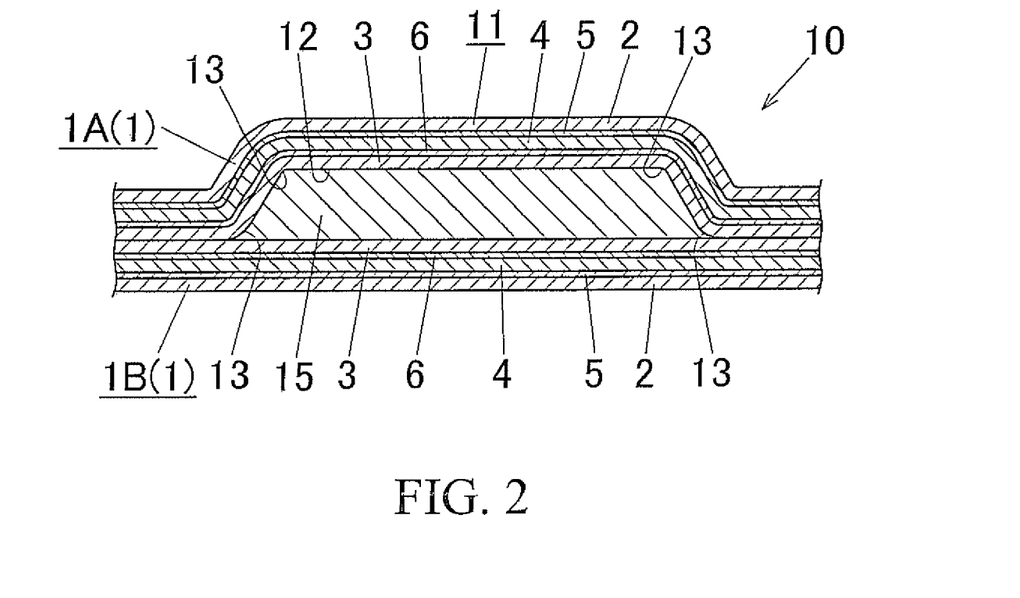
FIG. 2 is a cross sectional view illustrating one embodiment of a battery of the present invention.

One embodiment of the battery according to the present invention is illustrated in FIG. 2. The battery 10 of the present invention has two battery packaging materials 1 of the present invention and the battery body portion 15 described above. The battery body portion 15 contains an anode, a cathode, and an electrolyte.

One packaging material 1A of the two battery packaging materials 1 is molded into a three dimensional shape, such as an almost rectangular parallelepiped shape by molding (bulging, deep draw forming, and the like) and the other packaging material 1B is not molded and has a plane shape (FIG. 2).

Thus, the battery body portion 15 is disposed between the two battery packaging materials 1A and 1B, and the peripheral portions of the inner layers 3 and 3 of the two battery packaging materials 1A and 1B are seal bonded by heat sealing to thereby form the battery case 11, and the battery body portion 15 is enclosed in the internal space 12 of the battery case 11 (FIG. 2).

In the battery 10, when gas is generated and accumulated in the battery body portion 15 when the battery temperature excessively rises, so that the internal pressure rises and also when the temperature of the battery case rises to the range of 120° C. to 160° C., the penetration exhaust path 21 is likely to be generated in a corner portion 13 formed into a curved shape or a bent shape by the molding in the inner layer 3 or around the corner portion.

Therefore, in the battery 10, when gas is generated and accumulated in the battery body portion 15 when the battery temperature excessively rises, so that the internal pressure rises and also when the temperature of the battery case 11 rises to the range of 120° C. to 160° C., the penetration exhaust path 21 which communicates with the internal space 12 of the battery case 11 is generated in the corner portion 13 in the inner layer 3 or around the corner portion 13 and also the separation gap 22 which communicates with the penetration exhaust path 21 is generated between the aluminum foil layer 4 and the inner layer 3. Therefore, the gas in the battery case 11 is discharged to the outside through the penetration exhaust path 21 and the separation gap 22, so that the burst of the battery case 11 due to the internal pressure rise can be prevented (FIG. 3).

Furthermore, after the gas is discharged to the outside through the separation gap 22, the separated adhesives in the second adhesive layers 6 can be promptly melted and attached (bonded) by heat to block the separation gap 22, and therefore the electrolytic solution can be sufficiently prevented from flowing to the outside.

Figure 3:
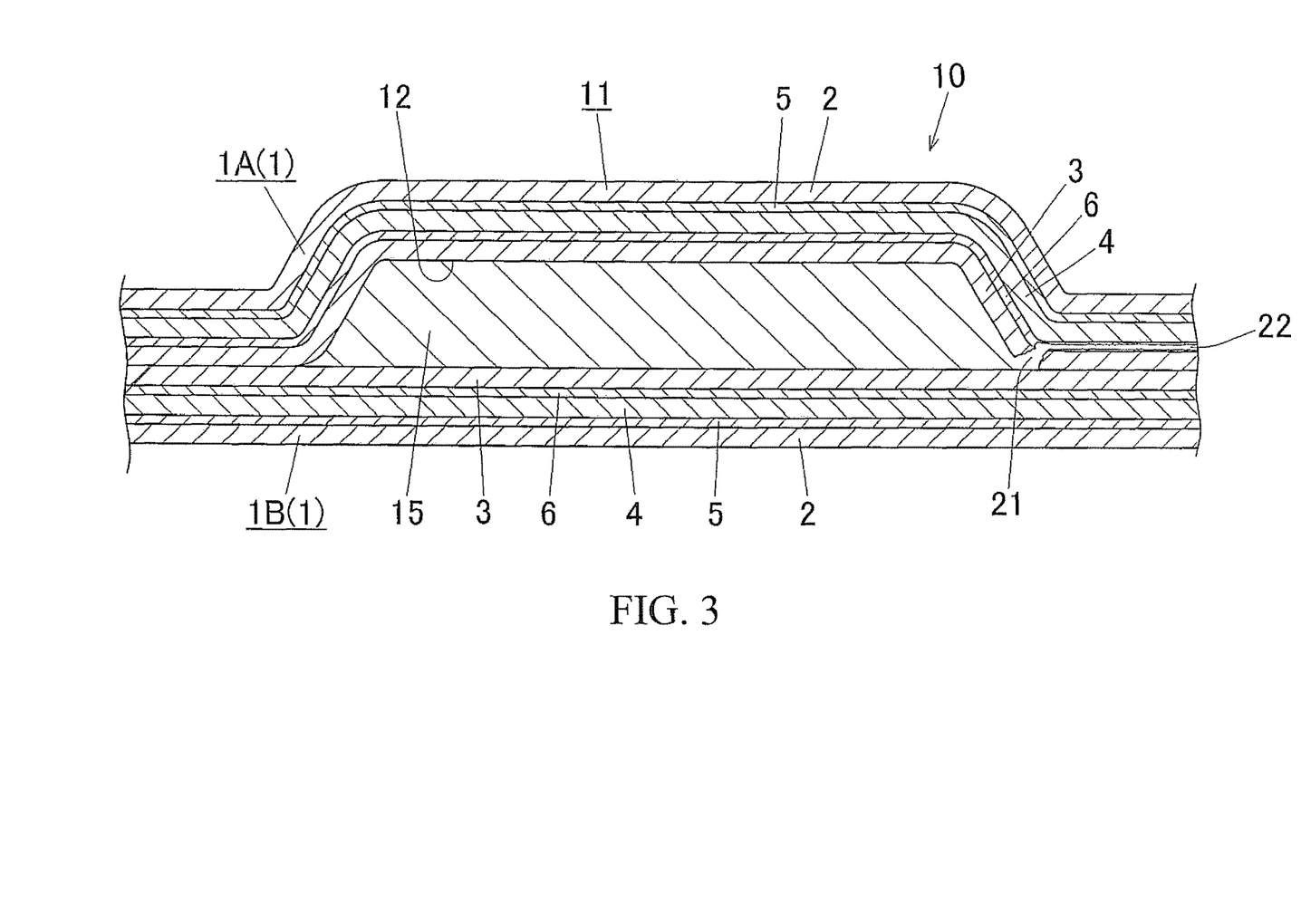
FIG. 3 is a schematic cross sectional view of the battery in a state where, due to the fact that the internal pressure and the temperature excessively rise, a penetration exhaust path is generated in an inner layer and also a separation gap is generated between the inner layer and an aluminum foil layer, so that gas in a battery case is discharged to the outside, and thus the burst due to an internal pressure rise is prevented.

FIG. 3 illustrates a state where the penetration exhaust path 21 is generated in the lower right corner portion 13 among the four corner portions 13 of the battery case 11. However, particularly the state is not always formed. For example, the penetration exhaust path 21 may be generated in the lower left corner portion 13 or the penetration exhaust path 21 may also be generated in the upper right corner portion 13 or the upper left corner portion 13.

FIG. 3 illustrates an aspect in which when the separation gap 22 is formed, the second adhesive layer 6 remains on both the aluminum foil layer 4 and the inner layer 3. However, the invention is not particularly limited to such an aspect and includes an aspect in which almost the second adhesive 6 adheres onto the aluminum foil layer 4 side and an aspect in which almost the second adhesive 6 adheres onto the inner layer 3 side, for example.

EXAMPLES

Next, specific examples of the present invention are described but the present invention is not particularly limited to the examples.

Example 1

A urethane resin adhesive (first adhesive layer) 5 was applied to one surface of a 40 μm thick aluminum foil (AA8079-O material) 4 by a gravure roll, and then dried by heating to some extent. Thereafter, a 25 μm thick biaxially stretched nylon film 2 was laminated on the adhesive coated surface to thereby obtain a laminated film.

Next, a second adhesive (second adhesive layer) 6 was applied to the other surface of the aluminum foil of the obtained laminated film by a gravure roll, and then dried by heating to some extent. Thereafter, a 40 μm thick non-stretched polypropylene film 3 was laminated on the adhesive coated surface to thereby obtain the battery packaging material 1 illustrated in FIG. 1. Two battery packaging materials 1 were prepared.

The second adhesive 6 is a composition obtained by mixing 1 part by mass of hexamethylene diisocyanate in a solution in which 15 parts by mass of a maleic anhydride modified polypropylene resin (resin obtained by graft polymerization of maleic anhydride with a copolymer of propylene and ethylene, acid value of 10 mgKOH/g) was dissolved in 85 parts by mass of an organic solvent (mixed solvent of methyl cyclohexane:methyl ethyl ketone=8:2 (mass ratio). The melting point of the second adhesive layer 6 formed by a reaction of the resin with isocyanate was 75° C. The viscosity at 25° C. of the solution (resin concentration of 15% by mass) in which the maleic anhydride modified polypropylene resin was dissolved in the organic solvent (mixed solvent of methyl cyclohexane:methyl ethyl ketone=8:2 (mass ratio) was 50 mPa·s.

In the obtained battery packaging material 1, the adhesion strength of the inner layer 3 and the aluminum foil layer 4 was 18 N/15 mm at 25° C., 4.0 N/15 mm at 80° C., and 1.5 N/15 mm width at 120° C.

One packaging material 1A of the two battery packaging materials 1 was molded into a three dimensional shape, such as an almost rectangular parallelepiped shape, by deep draw forming and separately the other packaging material 1B was not molded and had a plane shape, the battery body portion 15 was disposed between the two battery packaging materials 1A and 1B, and then the peripheral portions of the inner layers 3 and 3 of the two battery packaging materials 1A and 1B were heat sealed to thereby form the battery case 11, and thus the battery 10 in which the battery body portion 15 was enclosed in the internal space 12 of the battery case 11 was obtained (FIG. 2).

Example 2

The battery packaging material 1 illustrated in FIG. 1 was obtained in the same manner as in Example 1, except using, as the second adhesive 6, a composition obtained by mixing 1.5 parts by mass of hexamethylene diisocyanate in a solution in which 14 parts by mass of a maleic anhydride modified polypropylene resin (resin obtained by graft polymerization of maleic anhydride in a copolymer of propylene and ethylene, acid value of 13 mgKOH/g) and 6 parts by mass of a perfect hydrogenated petroleum (C9) resin (adhesion imparting agent, softening point of 100° C., one obtained by hydrogenating an unsaturated bond of resin obtained by polymerizing C8 or more aromatic hydrocarbon having an olefin unsaturated bond in the presence of a catalyst) was dissolved in 80 parts by mass of an organic solvent (mixed solvent of methyl cyclohexane:methyl ethyl ketone=8:2 (mass ratio).

The melting point of the second adhesive layer 6 formed by a reaction of the resin with isocyanate was 85° C. The viscosity at 25° C. of the solution (resin concentration of 15% by mass) in which the maleic anhydride modified polypropylene resin was dissolved in toluene was 50 mPa·s.

In the obtained battery packaging material 1, the adhesion strength of the inner layer 3 and the aluminum foil layer 4 was 17 N/15 mm at 25° C., 7.5 N/15 mm at 80° C., and 1.8 N/15 mm width at 120° C. The battery 10 was obtained in the same manner as in Example 1 using the battery packaging material 1.

Example 3

The battery packaging material 1 illustrated in FIG. 1 was obtained in the same manner as in Example 1, except using, as the second adhesive 6, a composition obtained by mixing 1 part by mass of hexamethylene diisocyanate in a solution in which 15 parts by mass of a maleic anhydride modified polypropylene resin (resin obtained by graft polymerization of maleic anhydride in a copolymer of propylene and ethylene, acid value of 20 mgKOH/g) was dissolved in 85 parts by mass of an organic solvent (mixed solvent of methyl cyclohexane:methyl ethyl ketone=8:2 (mass ratio).

The melting point of the second adhesive layer 6 formed by a reaction of the resin with isocyanate was 60° C. The viscosity at 25° C. of the solution (resin concentration of 15% by mass) in which the maleic anhydride modified polypropylene resin was dissolved in the organic solvent (mixed solvent of methyl cyclohexane:methyl ethyl ketone=8:2 (mass ratio) was 30 mPa·s.

In the obtained battery packaging material 1, the adhesion strength of the inner layer 3 and the aluminum foil layer 4 was 20 N/15 mm at 25° C., 3.2 N/15 mm at 80° C., and 1.2 N/15 mm width at 120° C. The battery 10 was obtained in the same manner as in Example 1 using the battery packaging material 1.

Example 4

The battery packaging material 1 illustrated in FIG. 1 was obtained in the same manner as in Example 1, except using, as the second adhesive 6, a composition obtained by mixing 1 part by mass of hexamethylene diisocyanate in a solution in which 15 parts by mass of a maleic anhydride modified polypropylene resin (resin obtained by graft polymerization of maleic anhydride in a copolymer of propylene and ethylene, acid value of 15 mgKOH/g) was dissolved in 85 parts by mass of an organic solvent (mixed solvent of methyl cyclohexane:methyl ethyl ketone=8:2 (mass ratio).

The melting point of the second adhesive layer 6 formed by a reaction of the resin with isocyanate was 85° C. The viscosity at 25° C. of the solution (resin concentration of 15% by mass) in which the maleic anhydride modified polypropylene resin was dissolved in the organic solvent (mixed solvent of methyl cyclohexane:methyl ethyl ketone=8:2 (mass ratio) was 60 mPa·s.

In the obtained battery packaging material 1, the adhesion strength of the inner layer 3 and the aluminum foil layer 4 was 17 N/15 mm at 25° C., 7.0 N/15 mm at 80° C., and 1.9

N/15 mm width at 120° C. The battery 10 was obtained in the same manner as in Example 1 using the battery packaging material 1.

Example 5

The battery packaging material 1 illustrated in FIG. 1 was obtained in the same manner as in Example 1, except using, as the second adhesive 6, a composition obtained by mixing 1 part by mass of hexamethylene diisocyanate in a solution in which 15 parts by mass of a maleic anhydride modified polyethylene resin (resin obtained by graft polymerization of maleic anhydride in a linear low density polyethylene wax resin, acid value of 10 mgKOH/g) was dissolved in 85 parts by mass of toluene.

The melting point of the second adhesive layer 6 formed by a reaction of the resin with isocyanate was 100° C.

In the obtained battery packaging material 1, the adhesion strength of the inner layer 3 and the aluminum foil layer 4 was 23 N/15 mm at 25° C., 7.5 N/15 mm at 80° C., and 2.0 N/15 mm width at 120° C. The battery 10 was obtained in the same manner as in Example 1 using the battery packaging material 1.

Comparative Example 1

A urethane resin adhesive 5 was applied to the surface of a 40 μm thick aluminum foil (AA8079-O material) 4 by a gravure roll, and then dried by heating to some extent. Thereafter, a 25 μm thick biaxially stretched nylon film 2 was laminated on the adhesive coated surface to thereby obtain a laminated film 40.

Figure 6:
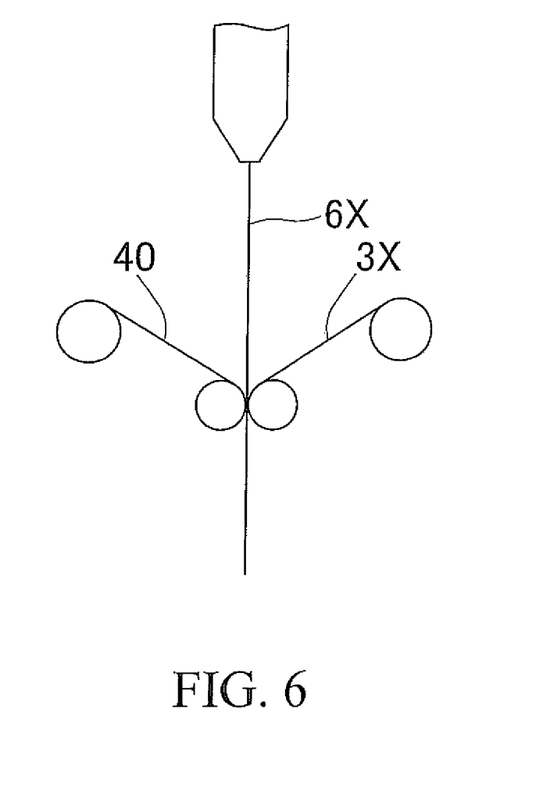
FIG. 6 is a view illustrating a method for manufacturing a battery packaging material according to Comparative Example 1.

Next, as illustrated in FIG. 6, while a 10 μm thick maleic anhydride modified polypropylene layer (melting point of 160° C.) 6X was extruded from an extrusion machine and separately the laminated film 40 was supplied with the aluminum foil 4 side as the laminated surface (upper surface in FIG. 4) from the left side in FIG. 6, a 30 μm thick non-stretched polypropylene film 3X was supplied from the right side in FIG. 6. Then, the extruded maleic anhydride modified polypropylene layer 6X was sandwiched between the films 3X and 40 with a pair of heating and pressurizing rolls for heat lamination, whereby a battery packaging material 1 was obtained.

In the obtained battery packaging material 1, the adhesion strength of the inner layer 3 and the aluminum foil layer 4 was 19 N/15 mm at 25° C., 8.5 N/15 mm at 80° C., and 3.0 N/15 mm width at 120° C. The battery 10 was obtained in the same manner as in Example 1 using the battery packaging material 1.

Comparative Example 2

The battery packaging material 1 illustrated in FIG. 1 was obtained in the same manner as in Example 1, except using, as the second adhesive 6, a composition obtained by mixing 1 part by mass of hexamethylene diisocyanate in a solution in which 10 parts by mass of acryl polyol having a cycloalkyl group was dissolved in 90 parts by mass of an organic solvent (mixed solvent of methyl cyclohexane: methyl ethyl ketone=8:2 (mass ratio).

When the melting point of the second adhesive layer 6 formed by a reaction of polyol and isocyanate was measured in a temperature region (25° C. to 200° C.) by a melting point measuring method described later, the dissolution peak was not present in this range, and thus it was found that the second adhesive layer does not have a melting point.

In the obtained battery packaging material 1, the adhesion strength of the inner layer 3 and the aluminum foil layer 4 was 12 N/15 mm at 25° C., 5.5 N/15 mm at 80° C., and 2.4 N/15 mm width at 120° C. The battery 10 was obtained in the same manner as in Example 1 using the battery packaging material 1.

Comparative Example 3

The battery packaging material 1 illustrated in FIG. 1 was obtained in the same manner as in Example 1, except using, as the second adhesive 6, a composition obtained by mixing 1 part by mass of hexamethylene diisocyanate in a solution in which 15 parts by mass of a maleic anhydride modified high density polyethylene resin (resin obtained by graft polymerization of maleic anhydride in a high density polyethylene resin, acid value of 15 mgKOH/g) was dissolved in 85 parts by mass of toluene.

The melting point of the second adhesive layer 6 formed by a reaction of the resin with isocyanate was 140° C.

In the obtained battery packaging material 1, the adhesion strength of the inner layer 3 and the aluminum foil layer 4 was 1 N/15 mm at 25° C., 1.0 N/15 mm at 80° C., and 0.5 N/15 mm width at 120° C. The battery 10 was obtained in the same manner as in Example 1 using the battery packaging material 1.

Comparative Example 4

The battery packaging material 1 illustrated in FIG. 1 was obtained in the same manner as in Example 1, except using, as the second adhesive 6, a composition obtained by mixing 1 part by mass of hexamethylene diisocyanate in a solution in which 10 parts by mass of a maleic anhydride modified ethylene-vinyl acetate copolymer resin (resin obtained by graft polymerization of maleic anhydride in an ethylene-vinyl acetate copolymer resin(vinyl acetate content of 35% by mass), acid value of 12 mgKOH/g) was dissolved in 90 parts by mass of toluene.

The melting point of the second adhesive layer 6 formed by a reaction of the resin with isocyanate was 57° C.

In the obtained battery packaging material 1, the adhesion strength of the inner layer 3 and the aluminum foil layer 4 was 14 N/15 mm at 25° C., 1.0 N/15 mm at 80° C., and 0.5 N/15 mm width at 120° C. The battery 10 was obtained in the same manner as in Example 1 using the battery packaging material 1.

In Examples and Comparative Examples above, the "adhesion strength" and the "melting point" each were measured as follows.

<Adhesion Strength Measuring Method>

A test material with 15 mm in width and 150 mm in length was cut out from the obtained battery packaging material 1, and then the end portion in the longitudinal direction of the test material was immersed in an alkaline separation liquid, whereby the inner layer 3 and the aluminum foil layer 4 were separated. Next, the separation strength when the inner layer 3 of the test material in the state where the end portion was separated was zipped with a zipper portion of Strograph manufactured by Toyo Seiki Seisaku-sho, Ltd., and then separated at 90° at a tensile speed of 100 mm/min was measured to be defined as the adhesion strength (lamination strength) (N/15 mm width) of the inner layer and the aluminum foil layer. The separation strength was measured at each of the temperature conditions (25° C., 80° C., and 120° C.)

<Melting Point Measuring Method>

The melt peak temperature measured at a temperature rise rate of 10° C./min using DSC (Differential scanning calorimeter) (Model type DSC-60A) manufactured by Shimadzu Corp. by the method specified in JIS K7121 (established in 1987) "Transition temperature measuring method of plastic" was defined as the "melting point."

Figure 7:
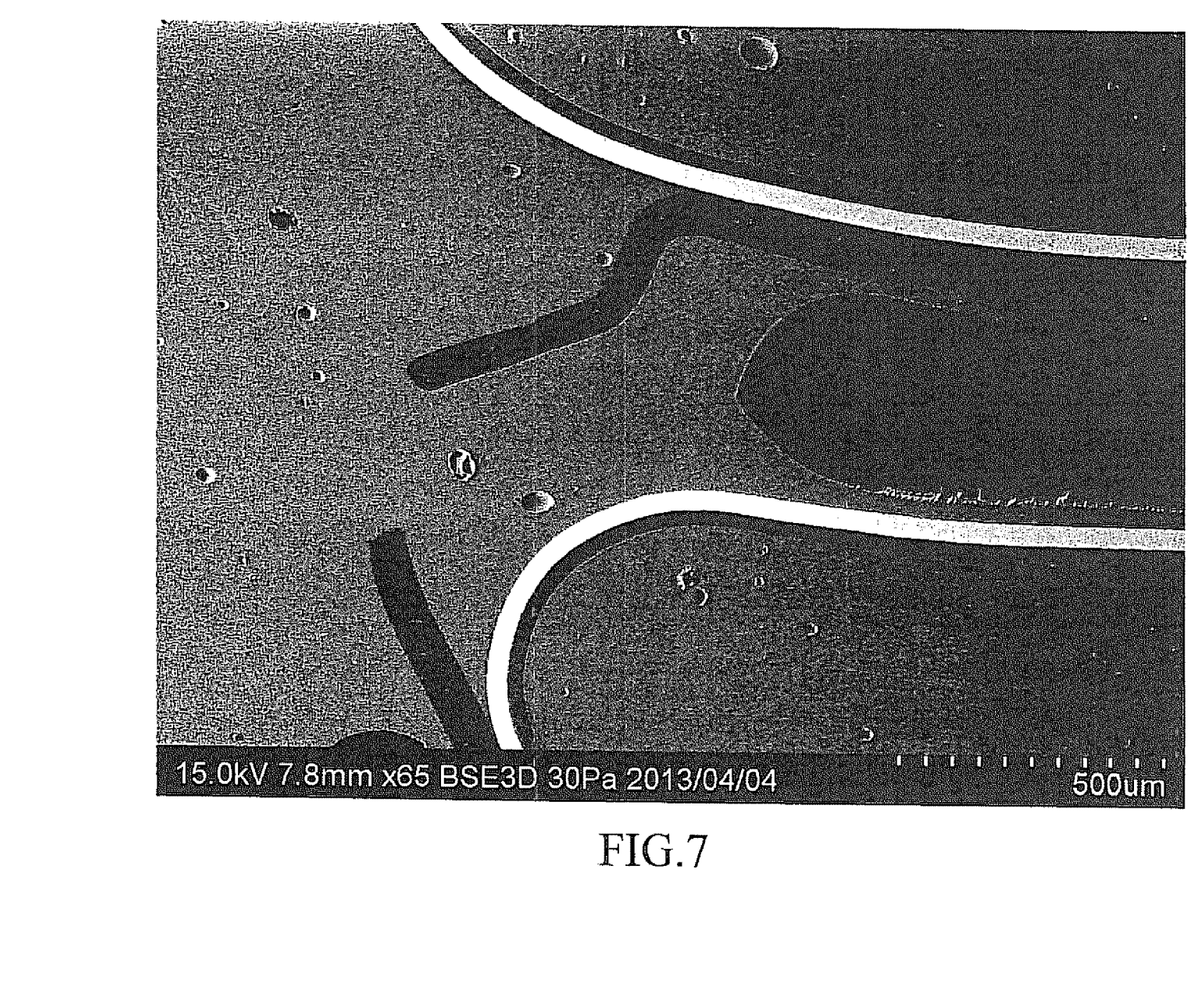
FIG. 7 is an electron micrograph (SEM photograph) showing a cross section of a region including a portion where the internal pressure and the temperature of a battery case excessively rise, degassing is performed, and then a penetration exhaust path is formed in the battery case and a separation gap in a battery of Example 1.
Figure 8:
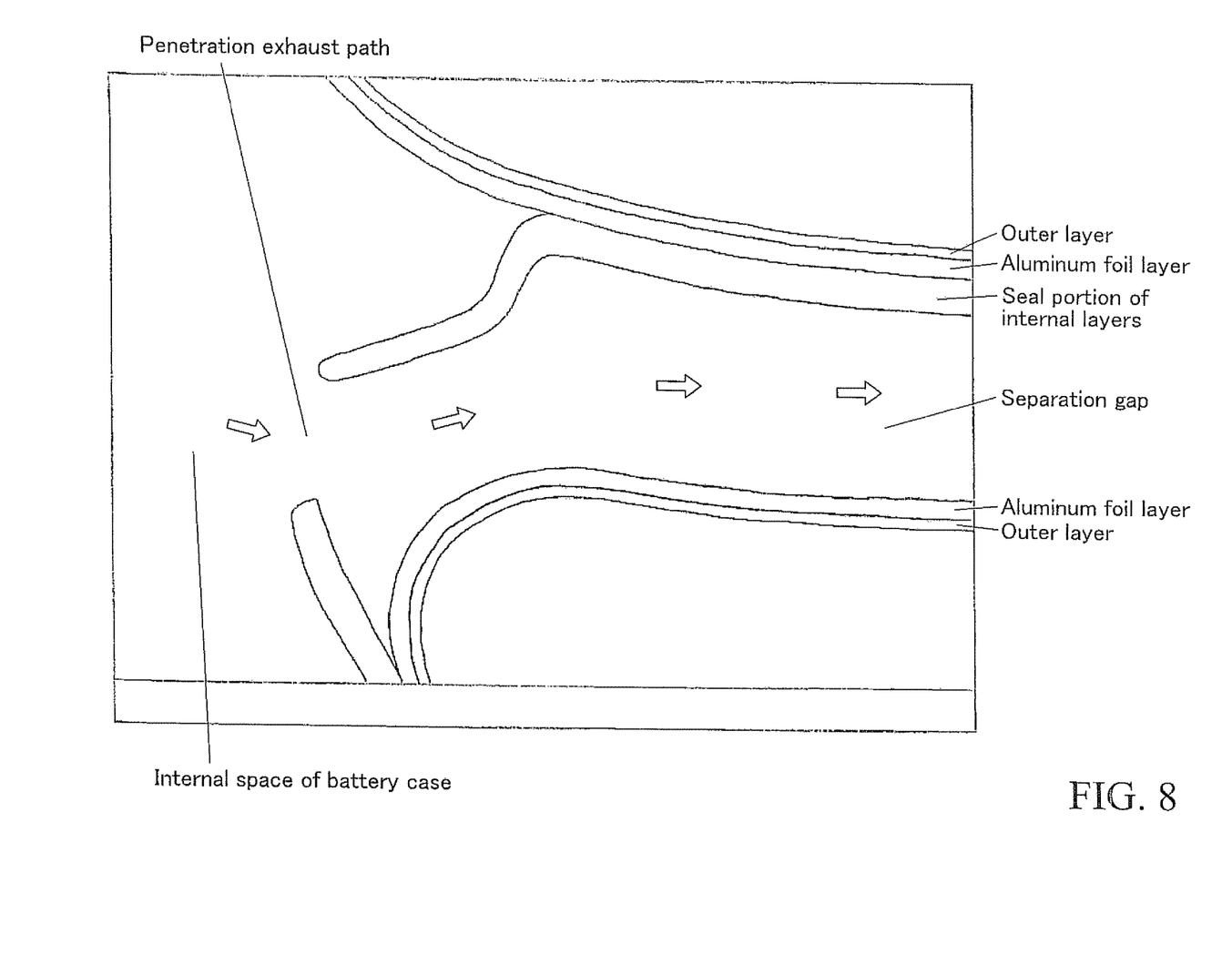
FIG. 8 is a schematic explanatory view of the electron micrograph in which each portion is specified in the electron micrograph of FIG. 7. The outlined thick arrow in FIG. 8 indicates a path in which the gas inside the battery is discharged to the outside.

FIG. 7) and also the penetration exhaust path which communicated with the separation gap and penetrated into the inner layer (seal portion of the inner layers) in almost the thickness direction was formed (FIG. 8). The outlined thick arrow in FIG. 8 shows the path in which the gas inside the battery was discharged to the outside.

TABLE 1

|  | Second adhesive layer | | Adhesion strength of inner layer and aluminum foil layer (N/15 mm width) | | | [Evaluation of burst prevention] Behavior of packaging material in excessively rise of |
| --- | --- | --- | --- | --- | --- | --- |
|  | Forming method | Melting point of adhesive (° C.) | 25° C. | 80° C. | 120° C. | temperature of battery packaging material |
| Example 1 | Dry lamination | 75 | 18 | 4.0 | 1.5 | Gas was discharged to the outside when the temperature reached 140° C./Contents did not flow to the outside. |
| Example 2 | Dry lamination | 85 | 17 | 7.5 | 1.8 | Gas was discharged to the outside when the temperature reached 140° C./Contents did not flow to the outside. |
| Example 3 | Dry lamination | 60 | 20 | 3.2 | 1.2 | Gas was discharged to the outside when the temperature reached 135° C./Contents did not flow to the outside. |
| Example 4 | Dry lamination | 85 | 17 | 7.0 | 1.9 | Gas was discharged to the outside when the temperature reached 145° C./Contents did not flow to the outside. |
| Example 5 | Dry lamination | 100 | 23 | 7.5 | 2.0 | Gas was discharged to the outside when the temperature reached 150° C./Contents did not flow to the outside. |
| Comparative Example 1 | Heat lamination | 160 | 19 | 8.5 | 3.0 | Gas was not discharged to the outside even when the temperature reached 170° C./Contents did not flow to the outside. |
| Comparative Example 2 | Dry lamination | — | 12 | 5.5 | 2.4 | Gas was not discharged to the outside even when the temperature reached 170° C./Contents did not flow to the outside. |
| Comparative Example 3 | Dry lamination | 140 | 1.0 | 1.0 | 0.5 | The separation between layers occurred due to insufficient adhesion strength. |
| Comparative Example 4 | Dry lamination | 57 | 14 | 1.0 | 0.5 | Separation between the inner layer and the aluminum foil layer occurred when the temperature reached 110° C. |

The burst prevention properties of the battery case 11 of each battery 10 of Examples 1 to 5 and Comparative Examples 1 to 4 obtained as described above was evaluated as follows. The results are shown in Table 1.

<Evaluation Method of Burst Prevention Properties>

The temperature was excessively raised to accelerate decomposition of an electrolytic solution to thereby gradually raise the internal pressure of the battery case 11 of each battery. Then, the behavior of the packaging material when the temperature was raised to the maximum temperature of 170° C. was investigated. When the gas in the battery case begun discharging to the outside, the temperature of the battery case 11 at the beginning of the discharge to the outside was measured. Moreover, it was also investigated whether the content liquid flowed to the outside when the temperature was excessively raised.

As is clear from Table 1, with respect to the batteries of Examples 1 to 5 constituted using the battery packaging material of the present invention, when the internal pressure of the battery case rose and also when the temperature of the battery case excessively rose, the gas in the battery case was discharged to the outside, so that the burst of the battery case due to the excessive rise in the internal pressure can be prevented and the content liquid did not flow to the outside.

FIG. 7 is an electron micrograph showing the state where the internal pressure and the temperature of the battery case excessively rose, and then degassing was performed in the battery of Example 1. As illustrated in FIGS. 7 and 8, it was recognized that the separation gap was generated between the seal portion (blackest portion; which was thick since the inner layers were seal bonded) of the inner layers and the aluminum foil layer (white portion in the lower portion in FIG. 7) and also the penetration exhaust path which communicated with the separation gap and penetrated into the inner layer (seal portion of the inner layers) in almost the thickness direction was formed (FIG. 8). The outlined thick arrow in FIG. 8 shows the path in which the gas inside the battery was discharged to the outside.

On the other hand, in the battery of Comparative Example 1, the second adhesive layer was formed by a heat lamination method, and therefore, even when the temperature of the battery case excessively rose to reach 170° C., the gas inside the battery was not discharged to the outside.

Moreover, in Comparative Example 3 in which the melting point of the second adhesive was higher than 100° C., since the melting point of the adhesive was excessively high, the adhesion by the dry lamination method was not favorably achieved. More specifically, the adhesion strength of the inner layer and the aluminum foil layer was as low as 1.0 N/15 mm at 25° C., and the adhesion strength was clearly insufficient. Therefore, Comparative Example 3 was not evaluated for the burst prevention properties.

In Comparative Example 2 in which the melting point of the second adhesive was not present, the adhesion strength of the inner layer and the aluminum foil layer exceeded 2.0 N/15 mm at 120° C. and even when the temperature of the battery case excessively rose to reach 170° C., the gas inside the battery was not discharged to the outside.

In Comparative Example 4 in which the melting point of the second adhesive is less than 60° C. and the adhesion strength of the inner layer and the aluminum foil layer was less than 3.0 N/15 mm at 80° C., when the temperature of the battery case reached 135° C., the gas in the battery case was discharged to the outside but when the temperature reached 110° C. before reaching 135° C., separation occurred between the inner layer and the aluminum foil layer (separation of the adhesives of the second adhesive layers), and therefore there was a problem in that the shape of battery case was not able to be held in this stage.

INDUSTRIAL APPLICABILITY

The battery packaging material according to the present invention is used as, for example, a battery packaging material for secondary batteries (such as lithium ion secondary battery) and the like. In particular, when the internal pressure and the temperature excessively rise, degassing can be performed, so that the burst of the packaging material due to the internal pressure rise can be prevented. Therefore, the battery packaging material is suitably used as a packaging material for a mobile battery and a packaging material for a car battery.

The battery according to the present invention is used as, for example, batteries, such as secondary batteries (lithium ion secondary battery and the like). In particular, when the internal pressure and the temperature excessively rise, degassing can be performed, so that the burst of the packaging material due to the internal pressure rise can be prevented. Therefore, the battery is suitably used as a mobile battery and a car battery.

This application claims priority to Japanese Patent Application No. 2013-115836 filed on May 31, 2013, the disclosure of which including the specification, the drawings, and the claims is hereby incorporated by reference in its entirety.

The terms and the descriptions used herein are used for describing the embodiment according to the present invention, and the present invention is not limited thereto. The present invention permits any design change within the scope of Claims without deviating from the spirit.

DESCRIPTION OF THE REFERENCE NUMERALS

1 Battery packaging material
2 Outer layer (Stretched heat-resistant resin film layer)
3 Inner layer (Non-stretched thermoplastic resin film layer)
4 Aluminum foil layer
5 First adhesive layer
6 Second adhesive layer
10 Battery
11 Battery case
12 Internal space
13 Corner portion
15 Battery body portion
21 Penetration exhaust path
22 Separation gap

The invention claimed is:

1. A battery packaging material, comprising:
   a stretched heat-resistant resin film layer as an outer layer which is laminated and integrated on one surface of an aluminum foil layer through a first adhesive layer; and
   a non-stretched thermoplastic resin film layer as an inner layer which is laminated and integrated on another surface of the aluminum foil layer through a second adhesive layer, wherein
   a first portion of the battery packaging material has a three dimensional molded shape formed by deep draw forming or bulging, and a second portion of the battery packaging material has a planar shape,
   the second adhesive layer is an adhesive layer which is formed by a dry lamination method and whose melting point is 60° C. to 100° C.,
   an adhesion strength of the inner layer and the aluminum foil layer is 3.0 N/15 mm width or more at 80° C., and the adhesion strength of the inner layer and the aluminum foil layer is 2.0 N/15 mm width or less at 120° C.,
   peripheral portions of an inner layer of the first portion of the battery packaging material are seal bonded by heat sealing to peripheral portions of an inner layer of the second portion of the battery packaging material to define a battery case with a battery body portion enclosed inside the battery case,
   when a temperature of the battery case rises to a range of 120° C. to 160° C., a penetration exhaust path that communicates with an internal space of the battery case is generated in the inner layer at a corner portion of the first portion of the battery packaging material, and a separation gap that communicates with the penetration exhaust path is generated in the second adhesive layer between the aluminum foil layer and the inner layer such that gas in the battery case is discharged to an outside through the penetration exhaust path and the separation gap to prevent bursting of the battery case due to a rise in internal pressure, and
   the corner portion has a curved shape or a bent shape.

2. The battery packaging material according to claim 1, wherein a melting point of an adhesive constituting the second adhesive layer is 70° C. to 90° C.

3. The battery packaging material according to claim 1, wherein the aluminum foil layer is one in which a chemical conversion coating is formed on both surfaces of the aluminum foil.

4. The battery packaging material according to claim 1, wherein the adhesive constituting the second adhesive layer is maleic anhydride modified polypropylene mixed with hexamethylene diisocyanate.

5. The battery packaging material according to claim 1, wherein the adhesive constituting the second adhesive layer is maleic anhydride modified polyethylene mixed with hexamethylene diisocyanate.

6. The battery packaging material according to claim 1, wherein the stretched heat-resistant resin film layer is constituted by a biaxially stretched polyamide film.

7. The battery packaging material according to claim 1, wherein the stretched heat-resistant resin film layer is constituted by a biaxially stretched polyethylene terephthalate film.

8. The battery packaging material according to claim 1, wherein the stretched heat-resistant resin film layer has a double layer configuration containing a biaxially stretched polyester film disposed on an outward side and a biaxially stretched polyamide film disposed on a side of the first adhesive layer.

9. The battery packaging material according to claim 1, wherein the stretched heat-resistant resin film layer has a double layer configuration containing a biaxially stretched polyethylene terephthalate film disposed on an outward side and a biaxially stretched nylon film disposed on a side of the first adhesive layer.

10. The battery packaging material according to claim 1, wherein the non-stretched thermoplastic resin film layer contains a non-stretched film containing at least one kind of a thermoplastic resin selected from the group consisting of polyethylene, polypropylene, an olefin copolymer, acid modified polyethylene, acid modified polypropylene, and an acid modified olefin copolymer.

* * * * *